United States Patent
Antonini

(10) Patent No.: US 6,698,723 B1
(45) Date of Patent: Mar. 2, 2004

(54) RATCHET TIE DOWN DEVICE WITH INTEGRAL SECURITY LOCK

(76) Inventor: Deno Antonini, 9210 Yucca Hills Rd., Agua Dulce, CA (US) 91390

( * ) Notice: Subject to any disclaimer, the term of this patent is extended or adjusted under 35 U.S.C. 154(b) by 0 days.

(21) Appl. No.: 10/317,055

(22) Filed: Dec. 12, 2002

(51) Int. Cl.$^7$ ................................................ B66D 3/04
(52) U.S. Cl. ........................................ 254/391; 254/415
(58) Field of Search ................................ 254/391, 405, 254/409, 411, 415, 417

(56) References Cited

U.S. PATENT DOCUMENTS

| | | | |
|---|---|---|---|
| 3,112,816 A | * | 12/1963 | Halford ...................... 254/391 |
| 3,806,094 A | * | 4/1974 | Harken ....................... 254/409 |
| 4,107,958 A | | 8/1978 | Manley, Jr. |
| 4,264,056 A | * | 4/1981 | Singer ........................ 254/391 |
| 4,510,652 A | | 4/1985 | van Iperen |
| 4,542,884 A | * | 9/1985 | Dodge, Jr. .................. 254/391 |
| 4,833,901 A | | 5/1989 | Sage et al. |
| 5,368,281 A | | 11/1994 | Skyba |
| 5,377,510 A | | 1/1995 | Smith |
| 5,423,644 A | | 6/1995 | First, Sr. |
| 5,531,083 A | | 7/1996 | Franck, III et al. |
| 5,542,798 A | | 8/1996 | Rawdon et al. |
| 5,615,865 A | * | 4/1997 | Fountain .................... 254/391 |
| 5,692,403 A | | 12/1997 | Ling |
| 5,722,640 A | | 3/1998 | Skyba |
| 5,823,020 A | | 10/1998 | Benda |
| 5,956,979 A | | 9/1999 | Collins et al. |
| 6,003,348 A | | 12/1999 | McCrea |
| 6,006,555 A | | 12/1999 | Shu-Fen |
| 6,044,669 A | | 4/2000 | Levi |

OTHER PUBLICATIONS

"Rope Ratchet ® Tie Down" Printed Sheet Taken From Package of Product. Mfr: Carolina North Manufacturing, Inc. 1325 South Park Dr., Kemersville, NC 27284, Date Unknown.

* cited by examiner

Primary Examiner—Emmanuel Marcelo
(74) Attorney, Agent, or Firm—David L. Banner

(57) ABSTRACT

A tie down device having a pulley incorporating a ratchet and a security lock. The tie down device has a housing which encloses a pulley over which is reeved a plastic jacketed metallic stranded cable, a ratchet wheel and associated pawl, and a key operated lock. The housing is formed in two parts united by rivets, and is devoid of externally accessible tool operated fasteners such as screws. A crank handle affords a user mechanical advantage when imposing tension on the cable. In an alternative embodiment, the tie down device includes a mounting element for securing the tie down device to a transport vehicle. In one alternative embodiment, a hook is provided to suspend the tie down device from an environmental object.

14 Claims, 2 Drawing Sheets

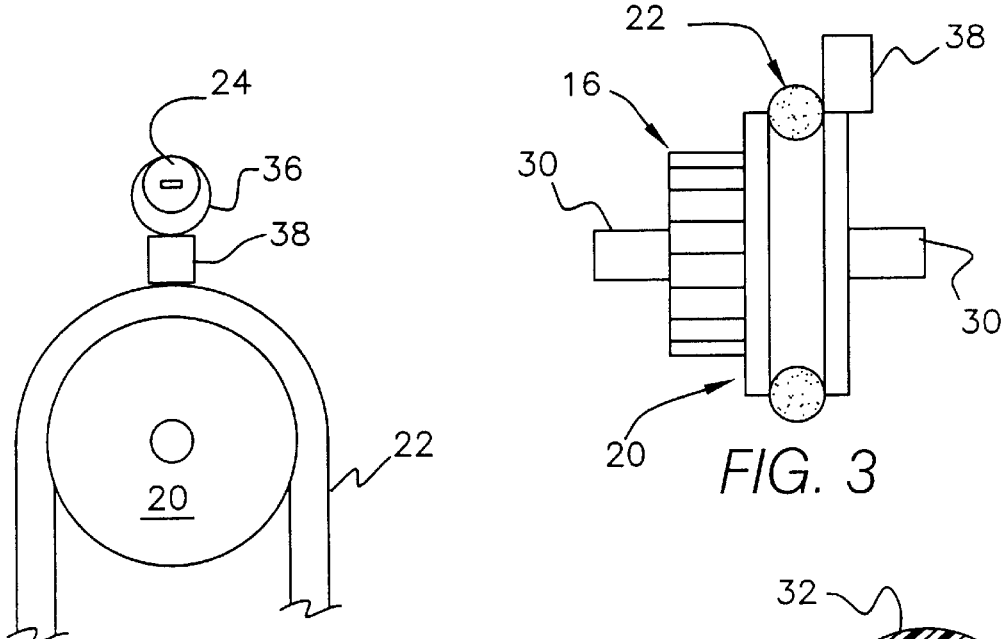
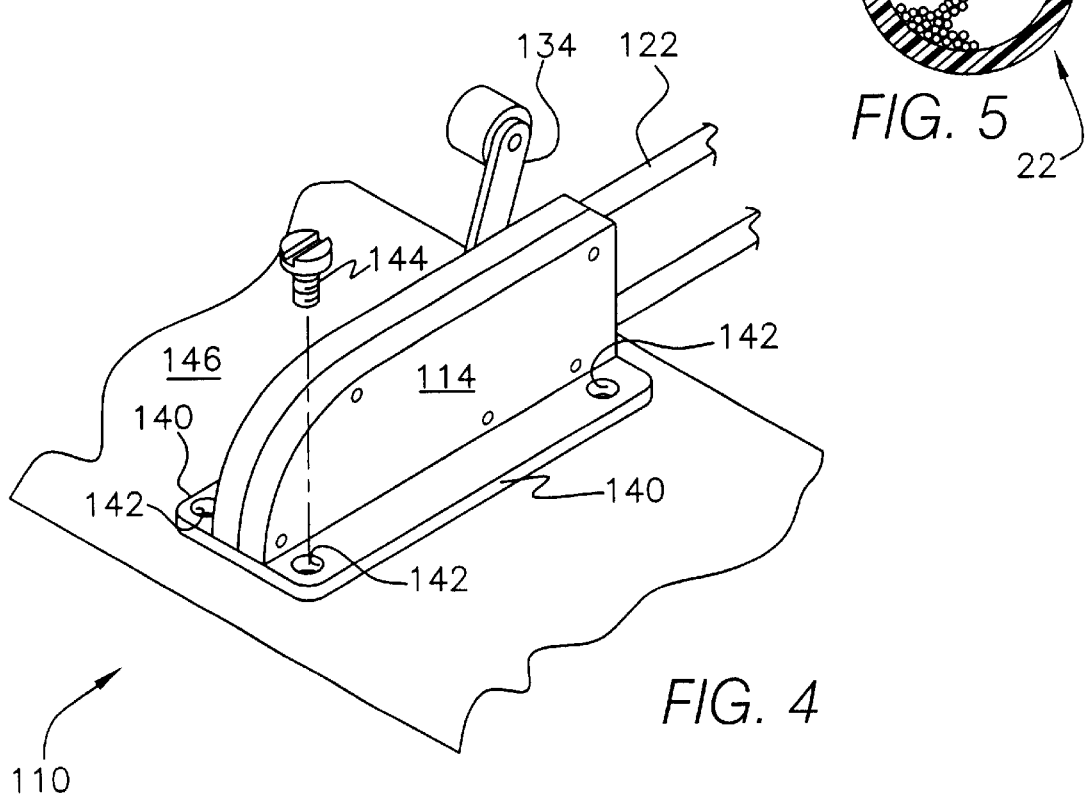

RATCHET TIE DOWN DEVICE WITH INTEGRAL SECURITY LOCK

BACKGROUND OF THE INVENTION

1. Field of the Invention

The present invention relates to rope and cable operated tie down devices and more particularly to a tie down device incorporating integrally therewith both a ratchet and a security lock.

2. Description of the Prior Art

Tie down devices incorporating ratchet and pawl assemblies have long been utilized to clamp objects to one another, particularly to form bundles of elongated objects such as lumber in the form of boards. The ratchet enables a person to increase tension on a web which encircles the boards or other objects, thereby preventing individual boards or objects from unintended loss. The bundle is practical to handle while loading, unloading, transporting, and the like. Also, the web may be placed around a supporting object, such as a transport vehicle or other object for transporting, lifting, or otherwise handling bundled objects.

Ratchet devices are conventionally constructed to enable a single person to expeditiously form bundles, to increase and maintain tension on the encircling web, and to release tension when bundling is no longer useful. An exemplary application of a ratchet is maintaining control of a load of lumber boards being delivered on a truck to a construction site. The ratchet device is released when the truck is parked at a suitable location for unloading the lumber. It is an implicit assumption that the driver of the truck or other personnel tasked with unloading will then release the ratchet and unload the lumber.

Ratchet devices of the prior art offer little security in the sense of theft deterrence. If the bundled articles are to be immediately transferred to authorized users, then security is not an issue. However, there are occasions when a bundled load will be left unattended, and theft or nuisance vandalism or removal becomes a problem. Security cables have been developed to secure articles against casual theft and removal. For example, cables incorporating locks have long been used to tether bicycles to suitable environmental objects such as telephone and power poles, and other relatively secure posts.

Such cables are suitable for tethering one object to another. However, lacking a ratchet, they are not practical for securing articles to others under tension. Such cables cannot practically be tightened without a ratchet. There exists a need in the prior art for a device having an elongated web or cable which combines the security provided by a lock with the ability to constrict under tension, as provided by a ratchet action device.

SUMMARY OF THE INVENTION

The present invention addresses the above mentioned need by providing both a ratchet action cable and a security lock. The ratchet action is employed in conventional fashion to encircle and constrict a web or cable over an object. A lock such as a key operated or combination type tumbler lock is provided to selectively prevent release of the web encircling and constricting the object being secured. An object fastened to a secure second object may then be left unattended, and will be secure from casual theft which would be possible in the absence of the lock. As employed herein, casual theft is that which may be performed without destroying or damaging the ratchet device, its associated web, articles secured thereby, and environmental objects to which the bundle or ratchet device may be fastened.

The novel ratchet action tie down device has a metallic housing which is assembled with rivets or is otherwise free from hand tool operated fasteners such as screws. This assures that mere disassembly of the device will not be sufficient to release the secured object. The web which encircles the secured object is preferably a plastic jacketed metallic cable. An auxiliary hook enables the ratchet action tie down device to be suspended for hoisting objects vertically. A crank handle affords the user mechanical advantage to assist in imposing tension on the web as it constricts over the object being secured.

Thus it will be seen that the abilities of constricting a web over or around one or more objects and preventing casual or unauthorized release of tension of the web after constricting are provided in a single device. The device automatically maintains tension imposed on the web, so that a single user can relax his or her grip of the web from time to time without relinquishing progress attained in constricting, as is conventionally provided in pawl and ratchet type devices. These abilities are afforded by a device which utilizes known, readily available components and materials for fabrication.

Accordingly, it is one object of the invention to combine in a single device the abilities to constrict a web over or around an object and to prevent casual or unauthorized release of tension of the web.

It is another object of the invention to maintain tension imposed on the web automatically, as provided by ratchet devices.

It is a further object of the invention to satisfy the above objects while utilizing known and readily available components.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 2 is a side elevational detail view showing details of one embodiment of a locking feature of the invention.

FIG. 3 is an end detail view of a pulley and a ratchet wheel mounted on a common axle.

FIG. 4 is a perspective view of another embodiment of the invention.

FIG. 5 is a cross sectional view of a cable which depends from the central structure of FIG. 1.

DETAILED DESCRIPTION OF THE PREFERRED EMBODIMENTS

Figure 1:
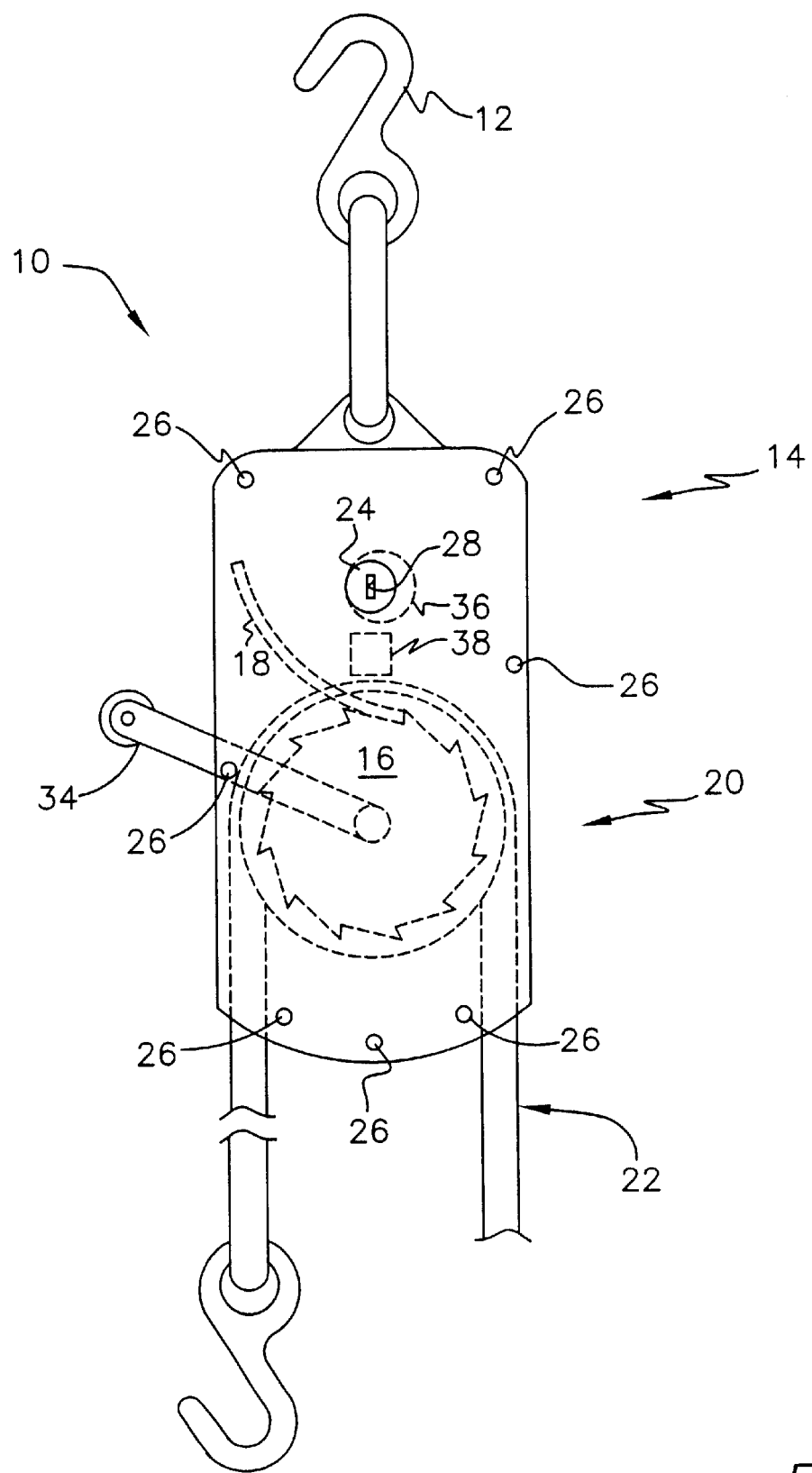
FIG. 1 is a side elevational view of one embodiment of the invention.

Turning now to FIG. 1 of the drawings, one embodiment of the invention is shown wherein ratchet action security tie down device 10 is in the form of a hoist attachable to an environmental object (not shown) by a suspension hook 12. Device 10 is seen to have a housing 14 enclosing a ratchet wheel 16, a pawl 18 disposed to engage ratchet wheel 16, a pulley 20 (see also FIGS. 2 and 3) for receiving a web 22 which is reeved over and retained on pulley 20, and a lock 24. Housing 14 is preferably formed in two mating, complementary metallic sections (only one being visible in the depiction of FIG. 1) which are joined together by rivets 26 to substantially enclose ratchet wheel 16, pawl 18, pulley 20, and lock 24. Housing 14 thereby is constructed to present no tool operated fasteners to the exterior of housing 14, and is thus resistant to disassembly by hand tools.

Lock 24 is enclosed within housing 14 except for an exposed face providing access to key hole 28. Lock 24 is a security lock, in that it requires a key or other security device which will enable only authorized users to open lock 24 without damaging or destroying lock 24.

The ratchet feature provided by ratchet wheel 16 and pawl 18 operates in conventional fashion, with pawl 18 entrapped within and secured to housing 14 in a position in which it engages ratchet wheel 16 to selectively constrain pulley 20 to rotate in only one direction and to oppose rotation in the other direction. Ratchet wheel 16 is operably connected to pulley 20. Turning momentarily to FIG. 3, both ratchet wheel 16 and pulley 20 are fixed to an axle 30 which is rotatably supported within housing 14. Ratchet wheel 16 will be said to be operably connected to pulley 20. As shown in enlarged scale in FIG. 5, the web is preferably a stranded metallic cable 22 having a generally circular cross section, having a plastic coating or jacket 32.

Returning to FIG. 1, device 10 in one embodiment has a crank handle 34 which is fixed to axle 30 (see FIG. 3) in a manner enabling a person to drive or rotate ratchet wheel 16 and pulley 20, and to be provided mechanical advantage when doing so. This characteristic assists in tying articles (not shown) under tension of the web, with the ratchet assembly comprising ratchet wheel 16 and pawl 18 maintaining that tension automatically.

A cam 36 is fixed to and rotated by lock 24. When cam 36 is rotated to a downward position, as depicted in FIG. 2, it bears against a friction brake 38, which in turn engages pulley 20 (engagement of brake 38 with pulley 20 is best seen in FIG. 3). It will be understood that housing 14 is so dimensioned and configured as to retain brake 38 thereto in a manner enabling the braking action described herein. Pulley 20 is fabricated to have a frictional surface contacting cable 22. Friction prevents cable 22 from slipping along the groove of pulley 20.

Ratchet wheel 16 may be released to rotate freely in either direction in any suitable way that does not defeat security provided by lock 24. Some examples will be described but are not illustrated. One possibility is that lock 24 may be located such that cam 36 pushes pawl 18 out of engagement with ratchet wheel 16 when cam 36 is in the released position shown in FIG. 1. Alternatively, a lifter or finger (not shown) may be driven by cam 36 to push pawl 18 out of engagement. In a further alternative, a yoke (not shown) encircling cam 36 may extend toward pawl 18 and pull pawl 18 out of engagement when cam 36 is rotated to the released position of FIG. 1.

Device 10 may be utilized in several ways. The embodiment of FIG. 1 may serve as a hoist when hook 12 is suspended from a suitable supporting environmental object (not shown). It is also envisioned that the ratchet action security tie down device 10 of the present invention be utilized as part of another object. As seen in FIG. 4, a tie down device 110 is adapted for surface mounting to another object (e.g., having surface 146). Device 110 will be understood to comprise a housing 114 enclosing all of the functional internal components of device 10 of FIG. 1, a crank handle 134 equivalent to crank handle 34 of the embodiment of FIG. 1, and a cable 122 equivalent to cable 22 of FIG. 1. In the embodiment of FIG. 4, housing 114 includes flanges 140 bearing holes 142 for receiving fasteners such as bolt 144. Bolt 144 is shown in symbolic capacity only for visual recognizability. However, it will be understood that bolt 144 will be a one-way driven fastener or will be replaced by a rivet or other fastener (none shown) which prevents ready removal of device 110 from surface 146 by hand or by hand tools. Flanges 140 and associated fasteners will collectively comprise a mounting element enabling device 110 to be mounted to an environmental object, such as that bearing surface 146.

This construction enables device 110 to be mounted to a surface 146 of a transport vehicle (not shown in its entirety). Surface 146 may be, for example, a fender of an automobile, a bed or wall of a truck, a gunwale or transom of a boat, or other sturdy structural member of the transport vehicle. The transport vehicle could be any known type, such as a non-motorized cart or road going trailer, or a motorized wheeled vehicle such as an automobile, truck, tractor, railway locomotive, motorcycle, boat, ship, or aircraft, or construction, mining, or earth moving equipment.

It would be equally feasible to mount device 110 to a static structure such as a freight platform, loading dock, wall of a building, fence or other structural post, and still other sturdy stationary or mobile environmental objects (not shown).

The present invention is susceptible to variations and modifications which may be introduced thereto without departing from the inventive concept. For example, a lock arrangement may act only on the pawl or only on the ratchet wheel and not impose direct braking force on a rotating component such as the pulley or the ratchet wheel. A finger moved by the lock may be moved selectively into and out of engagement, such as interfering engagement which immobilizes the pulley, with any component influencing the pulley.

The mounting element may be formed by making the housing or other structural part of the tie down device integral with the object to which the tie down is fastened. Flanges could be replaced by threaded holes formed in bosses or other sturdy portions of the housing.

The crank handle may be replaced by a stub which is driven by a hand or power tool such as, for example, a socket wrench. The crank handle or other rotatable drive may be geared to the axle or other component fixed to the pulley to afford additional mechanical advantage, or to provide such advantage while limiting length of the crank handle. The web associated with the pulley may be a flat strap, such as nylon or other synthetic or natural material rather than a cable which is substantially circular in cross section, with appropriate reconfiguring of the pulley. The lock may be a combination lock.

The web or cable may terminate in a hook as shown in FIG. 1 or alternatively may terminate only in a hook or may have still other terminations.

It is to be understood that the present invention is not limited to the embodiments described above, but encompasses any and all embodiments within the scope of the following claims.

I claim:

1. A ratchet action security tie down device for securing at least one article under maintained tension, having a pulley for receiving a web reeved over and retained on said pulley for securing the article, a ratchet wheel operably connected to said pulley, a pawl disposed to engage said ratchet wheel and to constrain said pulley to rotate in only one direction and to oppose rotation in the opposite direction, and a security lock disposed selectively to enable release of tension exerted on the web and to prevent tension exerted on the web from being released.

2. The ratchet action security tie down device according to claim 1, wherein the web is a stranded metallic cable having a generally circular cross section.

3. The ratchet action security tie down device according to claim 1, wherein said cable has a plastic coating.

4. The ratchet action security tie down device according to claim 1, further comprising a metallic housing substantially enclosing said pulley, said ratchet wheel, said pawl, and said security lock.

5. The ratchet action security tie down device according to claim 4, wherein said housing is constructed to present no tool operated fasteners to the exterior thereof, said housing thereby being resistant to disassembly by tools.

6. The ratchet action security tie down device according to claim 4, further comprising a suspension hook disposed to suspend said housing from an environmental object.

7. The ratchet action security tie down device according to claim 1, further comprising a crank handle disposed in driving relation to rotate said ratchet wheel and said pulley and to provide mechanical advantage when rotating said ratchet wheel and said pulley.

8. The ratchet action security tie down device according to claim 1, further comprising a mounting element for mounting said ratchet action security tie down device to an environmental object.

9. In combination, a transport vehicle having a body, and a ratchet action security tie down device for securing articles under maintained tension to said transport vehicle, wherein said ratchet action security tie down device has a pulley, a ratchet wheel operably connected to said pulley, a pawl disposed to engage said ratchet wheel and to constrain said pulley to rotate in one direction and to oppose rotation in the opposite direction, a web reeved over and retained on said pulley, for securing down the articles, a security lock disposed selectively to enable release of tension exerted on the web and to prevent tension exerted on the web from being released, and a mounting element disposed to secure said ratchet action security tie dow n device to said transport vehicle.

10. The ratchet action security tie down device according to claim 9, wherein the web is a stranded metallic cable having a generally circular cross section.

11. The ratchet action security tie down device according to claim 9, wherein said cable has a plastic coating.

12. The ratchet action security tie down device according to claim 9, further comprising a metallic housing substantially enclosing said pulley, said ratchet wheel, said pawl, and said security lock.

13. The ratchet action security tie down device according to claim 9, wherein said housing is constructed to present no tool operated fasteners to the exterior thereof, said housing thereby being resistant to disassembly by tools.

14. The ratchet action security tie down device according to claim 9, further comprising a crank handle disposed in driving relation to rotate said ratchet wheel and said pulley and to provide mechanical advantage when rotating said ratchet wheel and said pulley.

* * * * *